(12) United States Patent
Pieraccini et al.

(10) Patent No.: US 8,041,019 B2
(45) Date of Patent: Oct. 18, 2011

(54) METHODS AND APPARATUS FOR CALL BACK DISPOSITION AND RE-EVALUATION IN INTERACTIVE VOICE RESPONSE BASED CUSTOMER CARE

(75) Inventors: Roberto Pieraccini, Peekskill, NY (US); Zor Gorelov, North Caldwell, NJ (US); Alan Pan, Brooklyn, NY (US)

(73) Assignee: SpeechCycle, Inc., New York, NY (US)

( * ) Notice: Subject to any disclaimer, the term of this patent is extended or adjusted under 35 U.S.C. 154(b) by 1306 days.

(21) Appl. No.: 11/651,822

(22) Filed: Jan. 10, 2007

(65) Prior Publication Data

US 2007/0165808 A1    Jul. 19, 2007

Related U.S. Application Data

(60) Provisional application No. 60/758,693, filed on Jan. 12, 2006.

(51) Int. Cl.
*H04M 3/42* (2006.01)
(52) U.S. Cl. ............ 379/209.01; 379/88.23; 379/88.25; 379/917; 370/352

(58) Field of Classification Search ................. 379/67.1, 379/88.23, 142.04, 76, 88.01, 88.16, 88.19, 379/88.2, 88.25, 112.01, 209.01, 210.01, 379/917; 370/352
See application file for complete search history.

(56) References Cited

U.S. PATENT DOCUMENTS

| | | | | |
|---|---|---|---|---|
| 6,016,336 | A * | 1/2000 | Hanson | 379/88.23 |
| 7,545,920 | B2 * | 6/2009 | Wilson et al. | 379/112.01 |
| 2006/0159063 | A1 * | 7/2006 | Kumar | 370/352 |
| 2007/0047695 | A1 * | 3/2007 | Tal et al. | 379/67.1 |

* cited by examiner

*Primary Examiner* — Md S Elahee
(74) *Attorney, Agent, or Firm* — Frommer Lawrence & Haug LLP; William S. Frommer; Brian M. McGuire

(57) ABSTRACT

An interactive voice response (IVR) system which assists in identifying repeat callers, understanding whether they are calling for the same reason as one of their previous calls, and properly disposing of the call. If the repeat caller is calling for the same reason, information from the previous call (or the previous calls) is retrieved and an action based on a defined business logic for repeat callers may then be executed for the current call.

10 Claims, 3 Drawing Sheets

METHODS AND APPARATUS FOR CALL BACK DISPOSITION AND RE-EVALUATION IN INTERACTIVE VOICE RESPONSE BASED CUSTOMER CARE

CROSS-REFERENCE TO RELATED APPLICATIONS

This application claims a priority benefit to provisional application Ser. No. 60/758,693, filed on Jan. 12, 2006 which is hereby incorporated by reference in its entirety herein.

BACKGROUND OF THE INVENTION

In order to provide prompt and convenient service for customers, many companies have established customer support call centers. These centers provide one or more telephone numbers a customer can use to receive service and support information about various products. Typically, a customer experiencing a problem with or having a question about a particular product or service or having questions or difficulty installing or configuring a product or service will call the corresponding support center to receive specific information relating to the question or problem and preferably, instructions for resolving the problem.

However, these customer support call centers suffer from at least the following problems. First, staffing a call center with enough knowledgeable operators, also called agents or customer service representatives, to address a meaningful range of likely problems can be very expensive. The call center must hire enough agents to handle those times when most calls occur, or callers could have excessively long hold times before speaking to an agent. Long hold times are annoying to customers and hurt a company's reputation for providing quality customer service. Long hold times are an even bigger problem when the company does not provide a toll-free number and the caller is required to pay for the call. Thus, a call center might have more agents than needed at any given time with their associated costs.

Second, the time and cost required to train new agents is considerable and in some cases it could be weeks before an agent is allowed to answer a call on his own. Agents staffing the support center must be provided with the knowledge necessary to resolve common product and service related questions and problems. Often, because of the large scope of potential problems, it is simply not practical to impart the required information (i.e. the problem knowledge base) to each agent. For example, many of today's complex products require a team of engineers—each having a specialized area of expertise—to design, build, and service the products. Thus, a single person may not have all the information needed to solve a particular problem.

Third, the job of an agent is often very repetitive, and turnover can be high as agents lose interest in their work and quit their jobs. The most common customer support questions can represent up to 80% of all calls received. Turnover of 50% or greater is not unusual. For example, for a company with 100 agents experiencing 50% turnover, 50 agents would quit in a 12-month period. High turnover adds additional costs to the customer support call center for recruiting and training.

In an attempt to automate call centers, some companies have tried using prerecorded messages to provide answers to various common problems. Typically, a caller will hear simple audio recordings of portions of a spoken dialog that identify specific topics or problems. The caller is asked to press a certain key on his phone to identify the problem he is having. The caller will then hear another simple audio recording in the form of instructions for resolving a particular problem. These automated recordings are presented to the caller using what is called touch-tone Interactive Voice Response systems or IVR. Although the IVR instructions may resolve the aforementioned problems, the prerecorded solutions lack the flexibility to accept spoken inputs from the customer and tailor the response to the customer's specific situation. In addition, in order that the recordings be kept within a reasonable amount of time (since callers must memorize the instructions), the instructions may be simplified and generalized to such an extent that they do not provide sufficient help for the caller. Often, this results in unresolved problems and customer frustration.

In an IVR system, based on speech recognition technology, which implements a customer care service, for a given call-flow, the call may end in a defined final state (e.g. the caller successfully completes the call) or it may be prematurely interrupted. Typical reasons a call may be interrupted include a loss of connectivity, the caller requests to speak to a live operator, the caller hangs up, etc . . . . In any of those situations, the caller may choose to call back to: a) resume the previous service where he left off, in an attempt to complete it, or b) request a different service.

A common problem in traditional IVR systems is that repeat calls are processed without taking advantage of the knowledge of the outcome of the previous call from the same user. Because of this, callers always start the interaction from the beginning, as scripted, even if they have already performed several steps of it during a previous call. This common situation reduces customer satisfaction and unnecessarily increases call handling time for repeat callers. Moreover, the initial call of a repeat interaction may be wrongly classified as successfully solving the customer's problem, thereby affecting IVR call quality and performance evaluation and possibly call billing.

SUMMARY OF THE INVENTION

Therefore, a need exists for a system which identifies repeat callers, determines whether they are calling for the same reason as their previous call, and provides a proper disposition of the call.

The present invention is an IVR based system which assists in identifying repeat callers, understanding whether they are calling for the same reason as their previous call, and properly disposing of the call. If the repeat caller is calling for the same reason, information from the previous call(s) is retrieved. If a previous call relating to the current call was classified by the IVR as being completed, the previous call may now be re-classified as non-completed (for quality assessment and billing purposes). An action based on a defined business logic for repeat callers may then be executed on the current call, rather than re-starting interaction from the beginning, as occurs for new callers. Exemplary actions include: escalation to an agent, continuation of the IVR where the caller left off, and attempts to resolve the issue in a different manner by the IVR or by an agent.

Still other objects and advantages of the invention will in part be obvious and will in part be apparent from the specification and the drawings.

BRIEF DESCRIPTION OF THE DRAWING

For a more complete understanding of the invention, reference is made to the following description and accompanying drawing, in which.

DETAILED DESCRIPTION OF THE PREFERRED EMBODIMENTS

The preferred embodiments of the apparatus and method according to the present invention will be described with reference to the accompanying drawing.

Figure 1:
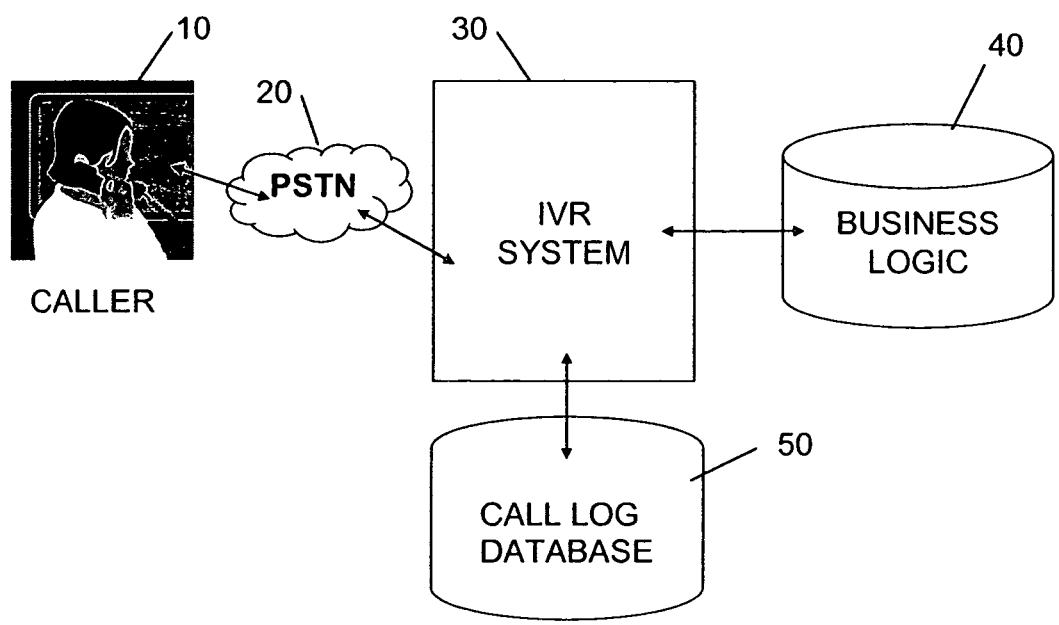
FIG. 1 is a diagram showing an exemplary system in accordance with the teachings of the present invention.

FIG. 1 shows the architecture of a system on which the present invention may be implemented. As shown in FIG. 1, a caller 10 connects, via the public telephone network (PSTN) 20, or any other voice network (e.g. local network, or VoIP), to an IVR system 30. The IVR system is controlled by business logic 40, which determines, upon the interpretation of the caller's speech, which prompt to play or which other action to perform (for instance, the IVR can be connected to another system, not shown in the figure, and request additional services or information in order to appropriately address the problem). Typically the business logic is implemented through a call-flow, which includes the actions (e.g. voice prompts, database lookup, etc.) to execute in response to a caller's voice request or answer. For each turn of the interaction, the IVR consults the business logic in order to plan and execute the next action. The IVR is also connected to a call log database 50 which includes relevant information about calls handled in a predefined period of time (e.g. hours, days, or months). This information is generally used for monitoring and billing for the IVR usage. Among other types of information, the call log database may include a categorization of each call based on the degree of success of the call in resolving a specific caller's customer care issue. For example, the IVR hosting company may charge a fee to the enterprise for the customer care service provided for each successfully completed call, as reported in the call log database. Alternatively, information in the call log database may be used for assessing the overall quality and effectiveness of the IVR, improving it, or monitoring unpredicted changes in the environment (e.g. outages in the services provided).

The present invention is based on implementation of the following steps:

1. Qualification of the call as a repeat call. The classification is typically based on:
   a. Caller identification: The caller needs to be identified. For some applications the caller is asked to provide an ID, whereas in other applications the caller may be identified from information available about the caller's telephone number (ANI). In other situations, specific questions can be asked to the user during the initial phase of the call (e.g. social security number).
   b. Search in the call log database for calls from the same caller in a predefined amount of time. Once the caller has been identified, the IVR may start a search in the call log database to determine whether the same caller has called previously. The previous call may be time limited to a predefined period, for instance the previous 24 hours. If a previous call(s) from the same caller is found, relevant information may be extracted from the database. Hereinafter, a retrieved call is also referred to as a previous call.
   c. Identification of the reason for the call. In order for the call to qualify as a repeat call, the IVR needs to make sure that the user is calling for the same reason as the previous call. This information can be verified by asking the caller directly or be based on the information about the previous call extracted from the call log database during step b.

2. Determining the next action (call disposition): Once the IVR has qualified the current call as a repeat call, it consults the business logic (e.g. the call flow) to determine the next action to take. Examples of next actions are as follows:
   a. Verifying that the caller is calling because the original problem of the previous call was not solved;
   b. Verifying the disposition of the previous call; for example, the call ended in the IVR or the call was transferred to an agent;
   c. Asking the user for more information about the problem;
   d. Enticing the user to continue resolving the issue in the IVR; or
   e. Escalating the call to a live agent. In case an escalation to an agent is necessary, information about the current and the previous call can be sent to the agent in a form that can be displayed to an agent as a "screen-pop" in order to reduce the agent's AHT (Average Handle Time).

3. Re-evaluation of the previous call. If the IVR has determined that the reason of the repeat call was non-completion of the previous call, the previous call may be re-evaluated. For instance, if the previous call was evaluated as being successfully completed and the IVR determined that the caller's problem was not actually solved, the call will be re-evaluated as not-completed.

Multiple Previous Calls

When searching for the previous call in the call log database, the IVR may find several calls from the same user within the window of time defined for the search. In that case, the calls will be analyzed to determine whether each belongs to the same chain of repeat calls—i.e. they were made for the same reason—or for a different chain of calls. For each chain of repeat calls, the most recent call needs to be determined. If there are multiple chains of calls (or multiple previous calls) all the different reasons need to be assessed and it needs to be determined whether the user is calling again for one of the previous reasons. This can be done by having the IVR list the "reasons for calling," if available, for all of the different previous call chains.

Figure 2:
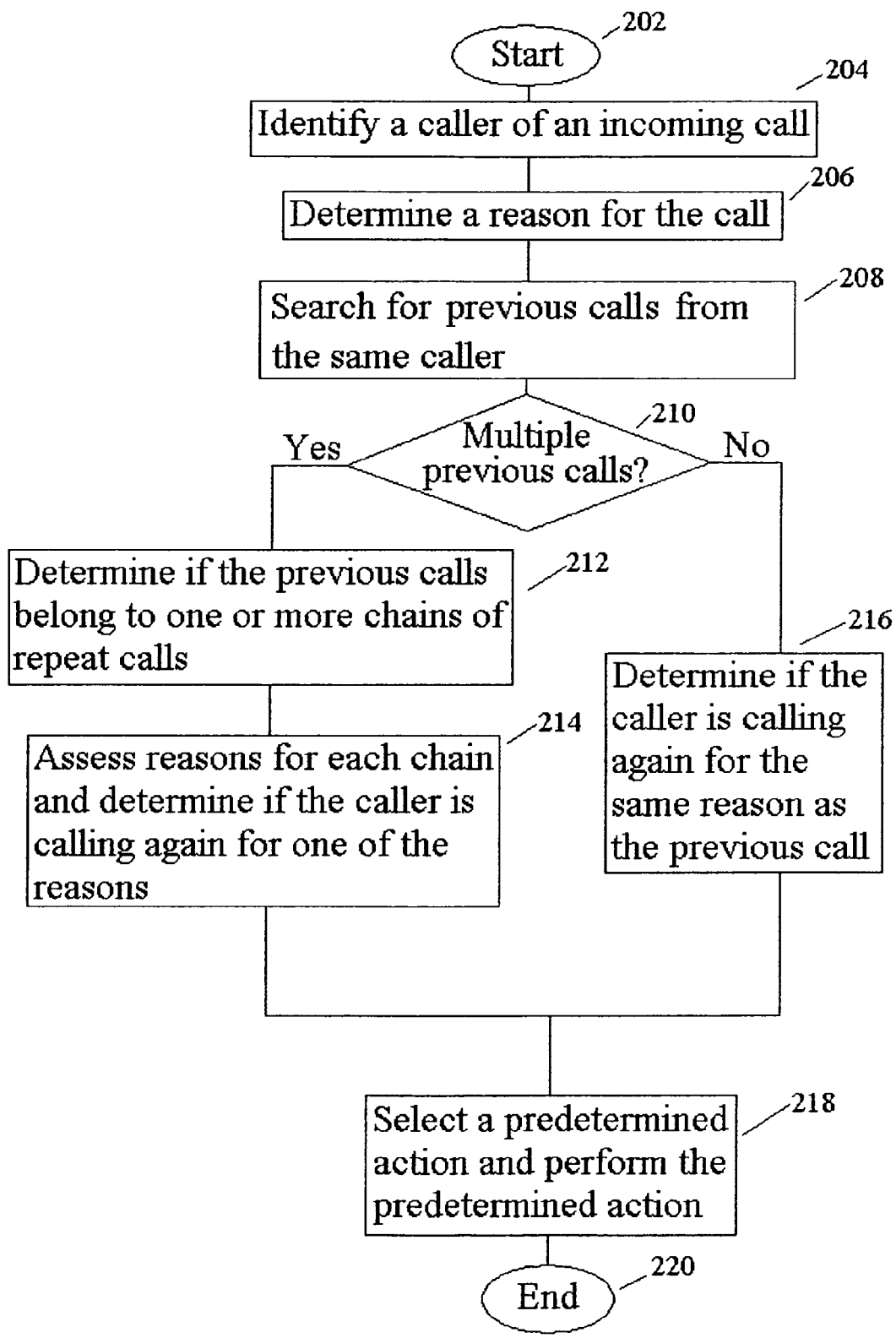
FIG. 2 is a flow chart showing an exemplary method in accordance with the teachings of the present invention.

FIG. 2 is a flow chart of the method implementing the present invention, which preferably is embodied in software that may be recorded on a computer-readable medium. Step 202 begins the method. At step 204 a caller making an incoming call is identified. For some applications the caller is asked to provide an ID, whereas in other applications the caller may be identified from information available about the caller's telephone number (ANI). In other situations, specific questions can be asked to the caller during the initial phase of the call (e.g. social security number). The process advances to step 206 which determines the reason for the call. This can be accomplished, for instance, by asking the caller directly. Once the caller has been identified, step 208 searches the call log database 50 for calls from the same caller. The IVR 30 may start a search in the call log database 50 to determine whether the same caller has called previously. The previous calls may be time limited to a predefined period, for instance the previous 24 hours, or other parameters for limiting the search may be applied. If a previous call(s) from the same caller is found, relevant information may be extracted from the call log database 50. Hereinafter, a retrieved call is also referred to as a previous call. The IVR may find several calls from the same user within the parameters defined for the search. Query 210 determines if multiple previous calls from the same caller were found. If the answer to query 210 is "yes", step 212 determines if the previous calls belong to one or more chains of repeat calls (i.e. chains of calls that were made for the same reason; a chain of calls can be made of one or more calls). If there are multiple chains of calls (or multiple previous calls) all the different reasons need to be assessed and it needs to be determined whether the user is calling again for one of the previous reasons. This can be done by having the IVR list the "reasons for calling," if available, for all of the different previous call chains. Step 212 is described in further detail in the description of FIG. 3 below. Step 214 assesses the reasons for each chain and determines if the caller is calling again for one of those reasons. In order for the current call to qualify as a repeat call, the IVR 30 needs to make sure that the user is calling for the same reason as the previous call. This information can be verified by asking the caller directly or be based on the information about the previous call extracted from the call log database 50 during step 208. If the answer to query 210 is "no" this is the case of a single previous call from the same caller. Step 216 determines whether the caller is calling for the same reason as the single previous call. In either the multiple previous-calls or the single previous-call case, the IVR 30 has now qualified whether the current call is a repeat call or not, and uses that information to consult the business logic 40 (e.g. the call flow) to determine the next action to take. Examples of the next action include verifying that the caller is calling because the original problem of the previous call was not solved, verifying the disposition of the previous call, for example, the call ended in the IVR or the call was transferred to an agent, asking the user for more information about the problem, enticing the user to continue resolving the issue in the IVR, and escalating the call to a live agent. In case an escalation to an agent is necessary, information about the current and the previous call can be sent to the agent in a form that can be displayed to an agent as a "screen-pop" in order to reduce the agent's AHT (Average Handle Time).

Figure 3:
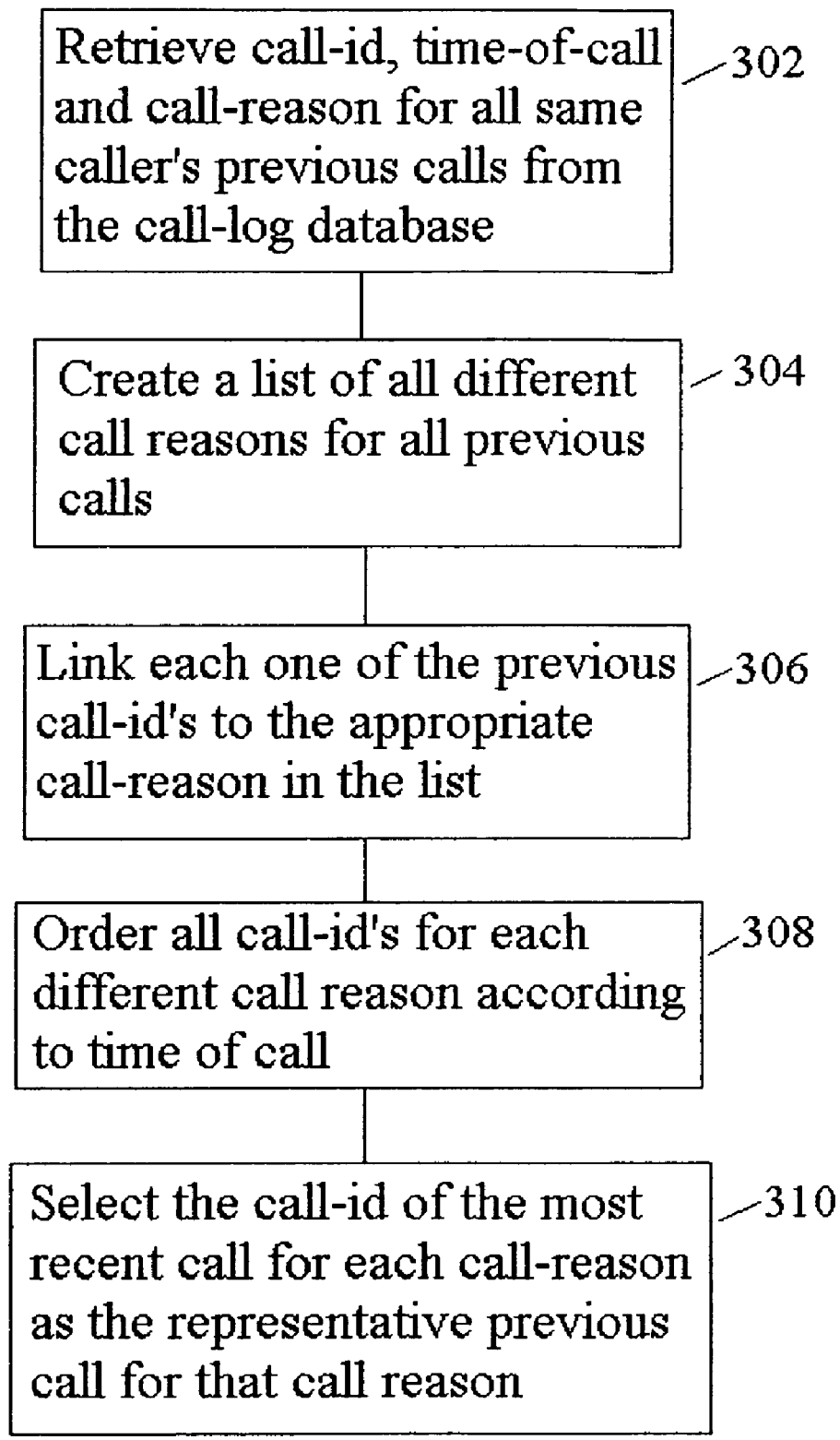
FIG. 3 is a flow chart showing an exemplary method in accordance with the teachings of the present invention.

FIG. 3 is a flow chart describing in detail the process performed by step 212 of FIG. 2. At step 302, IVR 30 retrieves a call-id, time-of-call and call-reason for all of the caller's previous calls from the call log database 50. At Step 304, IVR 30 creates a list of all different call reasons for all of the previous calls retrieved by step 302 and at step 306, IVR 30 links all of the call-id's for the previous calls retrieved by step 302 to the appropriate call reason in the list created by step 304. At step 308, IVR 30 orders all the call-id's for each different call-reason according to the time-of-call (e.g. from most recent to last recent). Each ordered set of calls is a chain of calls. The process advances to step 310, where the IVR 30 selects the call-id of the most recent calls for each call-reason as the representative previous call for that call reason.

While a preferred embodiment of the present invention has been described using specific terms, such description is for illustrative purposes only, and it is to be understood that changes and variations may be made without departing from the spirit or scope of the following claims.

What is claimed is:

1. A method of call back disposition and re-evaluation in interactive voice response based customer care, comprising the steps of:

identifying a caller of an incoming call;
determining a reason for said call;
searching for a previous call from said caller with said reason; and
selecting a predetermined action and performing the predetermined action upon identification of said caller,
wherein the method further comprises determining if a plurality of previous calls belong to a chain of repeat calls for said reason, if said searching step finds a plurality of previous calls with said reason from said caller; and wherein the method further comprises configuring the interactive voice response to change a status of the previous call to non-completion if the reason for the call was not solved.

2. The method according to claim 1, further comprising:
re-evaluating a status of the previous call if it is determined that the reason for the call was non-completion of the previous call.

3. The method according to claim 1, wherein said searching step searches for the previous call within a predetermined window of time.

4. The method according to claim 1, further comprising:
determining for the chain of repeat calls, which one of the plurality of previous calls is most recent.

5. The method according to claim 1, wherein said searching step includes the step of finding a plurality of chains of repeat calls from said caller, and further comprising the steps of assessing reasons for each chain and determining whether the caller is calling again for one of the reasons.

6. A system for call back disposition and re-evaluation in interactive voice response based customer care, comprising:
means for identifying a caller of an incoming call;
means for determining a reason for said call;
means for searching for a previous call from said caller with said reason ; and
means for selecting a predetermined action and performing the predetermined action upon identification of said caller,
wherein said system further comprises means for determining if a plurality of previous calls belong to a chain of repeat calls for said reason if said searching means finds a plurality of previous calls from said caller with said reason, and
wherein the system is configured to change the status of the previous call to non-completion if the reason for the call was not solved.

7. The system according to claim 6, further comprising:
means for re-evaluating a status of the previous call if it is determined that the reason for the call was non-completion of the previous call.

8. The system according to claim 6, wherein said searching means searches for the previous call within a predetermined window of time.

9. The system according to claim 6, further comprising:
means for determining for the chain of repeat calls, which one of the plurality of previous calls is most recent.

10. The system according to claim 6, wherein, if said searching means finds a plurality of chains of repeat calls, said means for performing the predetermined action assesses reasons for each chain determines whether the caller is calling again for one of the reasons.

* * * * *